US007010672B2

(12) United States Patent
Ahmad et al.

(10) Patent No.: US 7,010,672 B2
(45) Date of Patent: Mar. 7, 2006

(54) DIGITAL PROCESSOR WITH PROGRAMMABLE BREAKPOINT/WATCHPOINT TRIGGER GENERATION CIRCUIT

(75) Inventors: Sagheer Ahmad, Sunnyvale, CA (US); Anand Shirwal, Singapore (SG)

(73) Assignee: Infineon Technologies AG, Munich (DE)

(*) Notice: Subject to any disclaimer, the term of this patent is extended or adjusted under 35 U.S.C. 154(b) by 483 days.

(21) Appl. No.: 10/317,875

(22) Filed: Dec. 11, 2002

(65) Prior Publication Data
US 2004/0117605 A1    Jun. 17, 2004

(51) Int. Cl.
G06F 9/44 (2006.01)
G06F 11/36 (2006.01)

(52) U.S. Cl. ......................................... 712/227; 714/35
(58) Field of Classification Search ................ 712/227; 714/35
See application file for complete search history.

(56) References Cited

U.S. PATENT DOCUMENTS 4,782,461 A * 11/1988 Mick et al. .................... 703/28
5,664,159 A    9/1997 Richter et al.
5,704,034 A * 12/1997 Circello ......................... 714/38
5,754,839 A *  5/1998 Pardo et al. ................. 712/227
5,889,981 A    3/1999 Betker et al.
5,995,992 A * 11/1999 Eckard ......................... 708/497

* cited by examiner

Primary Examiner—Daniel H. Pan
(74) Attorney, Agent, or Firm—Darby & Darby

(57) ABSTRACT

A digital processor having a programmable breakpoint/watchpoint (BWP) trigger circuit that generates BWP triggers in response to user-defined combinations and/or sequences of trigger events. Several trigger event detection registers generate pre-trigger signals when stored trigger values (e.g., instruction addresses or data addresses/values) match addresses/values transmitted on busses within the processor core. Sum-of-products circuits generate intermediate combinational trigger signals in accordance with user-defined combinations of the pre-trigger signals. A finite state machine generates an intermediate sequential trigger signal in response to user-defined sequences of the intermediate combinational trigger signals. Either the intermediate combinational trigger signals or the intermediate sequential trigger signal are selectively passed to an action generator, which transmits an associated breakpoint or watchpoint trigger signal to a decode stage of the processor core or other destination.

20 Claims, 4 Drawing Sheets

DIGITAL PROCESSOR WITH PROGRAMMABLE BREAKPOINT/WATCHPOINT TRIGGER GENERATION CIRCUIT

FIELD OF THE INVENTION

The present invention relates generally to digital processor devices, and more particularly to a method and structure for improving the generation of breakpoint or watchpoint trigger signals in such processor devices.

BACKGROUND OF THE INVENTION

FIG. 1 is a simplified block diagram showing a conventional digital processor 100 including a core section 110, a data and address arbitration circuit 120, and on-board memory components including a RAM 130 and a ROM 135. Core section 110 includes various pipeline stages and associated registers including, a fetch stage 112, decode stage 114, an execute stage 116, and a write back stage 118. As would be understood by those skilled in the art, instructions to be executed on the processor are fetched or retrieved by means of hardware included in the fetch stage 112. The instructions are then decoded in the decode stage 114 and executed in an appropriate sequence in the execute stage 116. Instructions and data are transmitted to and from core 110 using an instruction address bus 121, an instruction value bus 123, a data address bus 125, and a data value bus 127. Data and address bus arbitration circuit 120 coordinates the transmission of data and instruction values from core 110 to on-board memory components (e.g., a RAM 130 and a ROM 135), which are coupled to buses 121, 123, 125, and 127 through the arbitration circuit 120.

FIG. 2 is a simplified diagram showing a Breakpoint/Watchpoint (BWP) trigger circuit 140, which is typically included in many digital processors, such as processor 100, to monitor instruction addresses or data addresses/values being fetched by the processor core during program execution, and to serve as part of a debugging tool used by programmers and software engineers (developers) during the development of complex programs.

BWP trigger circuit 140 typically includes one or more instruction address registers 147 and data address/value registers 149 that store user-defined addresses/values, and asserts one or more BWP trigger signals (BWP TRIGGER 0 through BWP TRIGGER 3) when an associated "BWP trigger event" occurs (i.e., an address/value stored in registers 147 and 149 matches an address/value transmitted on buses 121, 125, or 127). BWP trigger events generally fall into two categories: instruction BWP trigger events, and data BWP trigger events. Instruction BWP trigger events occur when an instruction is executed whose address (as transmitted on bus 121) matches the address stored in programmable register 147. Instruction BWP trigger events can either be Break Before Make (BBM) events, or Break After Make (BAM) events. BBM events occur when all instructions preceding the instruction associated with the pre-loaded address are retired (executed) by the processor (e.g., in decoder stage 114 of processor core 110). BAM events occur when any architectural state is changed by executing the instruction associated with the pre-loaded address (e.g., in write back stage 118). Data BWP trigger events occur when a data address transmitted on bus 125 and/or a data value transmitted on bus 127 matches the address/value stored in programmable register 149.

The addresses/values stored in programmable registers 147 and 149 are typically set by a program developer as part of an interactive debugging operation used to scrutinize a program's execution. When the address of the code being fetched (or address/value of data being read/written) matches with the address/value stored in programmable registers 147 or 149, then one or more associated BWP triggers are transmitted to either the core 110 (referred to herein as "breakpoint triggers") or to an external system ("watchpoint triggers"). Thus, BWP trigger circuit 140 facilitates the software development process by allowing the developer to control core 110 (e.g., by executing a halt or trap) when a user-defined breakpoint trigger event occurs (e.g., at a specific processor state), or to generate an external signal indicating a specific processor state when a user-defined watchpoint trigger event occurs.

While conventional BWP trigger circuit 140 provides developers with a useful debugging tool, it is not flexible enough to generate BWP triggers in response to a complex sequence of trigger events. As discussed above, BWP trigger circuit 140 asserts associated BWP triggers when an instruction address or data address/value transmitted on an associated bus matches the values stored in registers 147 and 149. However, as software programs become more complex, developers may wish to generate BWP triggers when a complex sequence of trigger events occurs (e.g., when a specific sequence of instructions are called/executed), something that is not possible with conventional BWP trigger circuit 140.

What is needed is a BWP trigger circuit that provides a developer the option of generating BWP triggers in response to complex combinations of trigger events.

SUMMARY OF THE INVENTION

The present invention is directed to a digital processor including a programmable breakpoint/watchpoint (BWP) trigger circuit that generates BWP triggers in response to user-defined combinations and/or sequences of instruction and/or data addresses/values utilized in the processor core, thereby facilitating substantially more flexible debugging operations for developing complex software programs than is possible using conventional BWP trigger circuits. In particular, the BWP trigger circuit includes a plurality of trigger event detection registers that generate pre-trigger signals in response to user-defined trigger events, and a programmable trigger logic circuit that generates intermediate (combinational) trigger signals in response to user-defined combinations of the pre-trigger signals, and/or generates an intermediate (sequential) trigger signal in response to a user-defined sequences of either the pre-trigger signals or the combinational trigger signals. The intermediate trigger signals are then passed to an action generator, which asserts an associated BWP trigger (e.g., a "halt" breakpoint command that is transmitted to a decoder stage of the processor core). Accordingly, the programmable BWP trigger circuit of the present invention facilitates highly flexible debugging operations during the development of a software program by allowing a developer to define a wide range of trigger event combinations and/or sequences for the generation of BWP triggers.

In accordance with an aspect of the present invention, the trigger event detection registers store binary trigger values (i.e., instruction addresses and/or data addresses/values), and monitor instruction addresses and/or data addresses/values transmitted on associated bus lines in the processor core. In one embodiment, the trigger event detection registers include instruction registers that store an instruction address trigger value (i.e., an instruction address or ranges of addresses) and monitor instruction address busses coupled to fetch and write back stages of the processor core, and data registers that store data addresses and data values (or ranges of addresses/values) and monitor data address/value busses coupled to the write back stage of the processor core. The data registers also include an optional mask register for masking unwanted data values. During a debugging operation, when a trigger event occurs (i.e., when an instruction address and/or data address/value transmitted on associated bus lines match the instruction address/range and/or data address/value/range stored in an associated trigger event detection registers), then the associated trigger event detection register asserts its pre-trigger signal (e.g., generates a logic 1). Conversely, each instruction register or data register that does not detect a trigger event maintains its associated pre-trigger signal in a de-asserted state (e.g., generates a logic 0).

In accordance with another aspect of the present invention, programmable trigger logic circuit includes one or more combinational function generators that generate intermediate (combinational) trigger signals in response to a set of pre-trigger signals generated by an associated group of trigger event detection registers. In one embodiment, each function generator is a 16-bit sum-of-products (SOP) circuit that is controlled by four pre-trigger signals. Each 16-bit SOP circuit implements a user-defined logic function of the four pre-trigger signals by storing sixteen bit values provided by the user/developer. During a debugging operation, the pre-trigger signals applied to each 16-bit SOP circuit address one of the sixteen stored bit values, which is generated at the SOP output terminal as a combinational trigger signal. When the bit value addressed by the four pre-trigger signals is a logic 1, then the combinational trigger signal is a logic 1. Conversely, when the bit value addressed by the four pre-trigger signals is a logic 0, then the combinational trigger signal is a logic 0.

In accordance with another aspect of the present invention, programmable trigger logic circuit includes one or more programmable state machines that generate intermediate (sequential) trigger signals in response to user-defined sequences of combinational trigger signals generated by an associated group of function generators. In one embodiment, the programmable state machine is a finite state machine defining four states, and receives four combinational trigger signals from four associated function generators. Each state includes a register for storing a user-defined two-bit value corresponding to the four combinational trigger signals. During a debugging operation, the combinational trigger signals are applied to the first state of the finite state machine. When the combinational trigger signal corresponding to the two-bit value stored by the first state is asserted, control is passed to the second state, and so on until a final state is reached. When the combinational trigger signal corresponding to the two-bit value stored by the final state is asserted, the sequential trigger signal associated with the finite state machine is asserted (e.g., logic 1).

In accordance with yet another aspect of the present invention, a user-programmable output circuit passes either the combinational trigger signals or the sequential trigger signal to the action generator for generation of the associated BWP trigger.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 3:
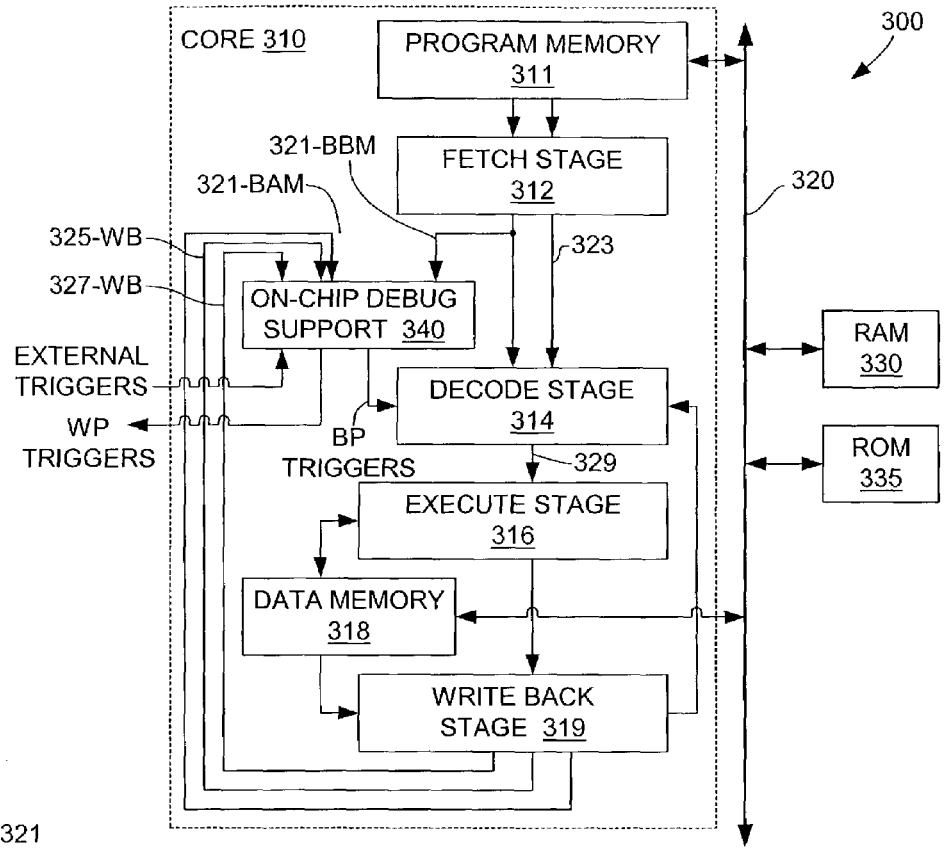
FIG. 3 is a simplified block diagram showing a digital processor according to an embodiment of the present invention.

FIG. 3 is a block diagram showing a simplified processor 300 in accordance with an embodiment of the present invention. Processor 300 includes a core 310 that communicates via a bus 320 with on-board memory components (e.g., a RAM 330 and a ROM 335). Core 310 includes a program memory 311 for storing instructions associated with a developer's software program, a fetch stage 312 for fetching (retrieving) instructions to be executed, a decode stage 314 for decoding the fetched instructions, an execute stage 316 for executing the instructions is an appropriate order, a data memory 318 for temporarily storing data acted upon by execute stage 316, and a write back stage 319 for writing data and instructions back to preceding sections of core 310 and to the on-board memory components. Instructions and data are transmitted to and from core 310 using bus 320, which includes an instruction address bus 321, an instruction value bus 323, a data address bus 325, and a data value bus 327, portions of which are indicated in core 310 for descriptive purposes. An arbitration circuit (not shown) may be utilized in conjunction with bus 320 to facilitate communication between core 310 and the on-board memory. The operation of core 310 is generally known in the art and is beyond the scope of the present invention; therefore, a detailed description of core 310 is omitted for brevity.

In accordance with an aspect of the present invention, processor 300 also includes an on-chip debug support (OCDS) circuit 340, which in the disclosed embodiment is incorporated into core 310, but can be physically located away from the core area in some embodiments. The purpose of the OCDS circuit 340 is to generate breakpoint (BP) trigger signals (indicated as being directed to decode stage 314) and watchpoint (WP) trigger signals (which are directed outside of core 310) in response to user-defined trigger events occurring within core 310, and also in response to external trigger events generated outside of core 310. Of particular relevance to the present invention are the user-defined trigger events occurring within core 310, and more particularly the instruction addresses and data addresses/values utilized in core 310 during program operation. In the embodiment shown in FIG. 3, OCDS circuit 340 receives first instruction address signals from fetch stage 312 via a first instruction bus portion 321-BBM, and second instruction address signals from write back stage 319 via a second instruction bus portion 321-BAM. OCDS circuit 340 also receives data address signals from write back stage 319 via a portion of data address bus 325 that is designated 325-WB, and data value signals from write back stage 319 via a portion of data value bus 327 that is designated 327-WB. The operation of OCDS circuit 340 to generate trigger signals in response to the data and instruction events transmitted via these busses is described below in additional detail. While other operations of OCDS circuit 340 are briefly mentioned below, a detailed discussion of OCDS circuit 340 operations in response to other (i.e., non-data and non-instruction based) trigger events occurring within core 310, and in response to the external triggers, is omitted for brevity.

Figure 4:
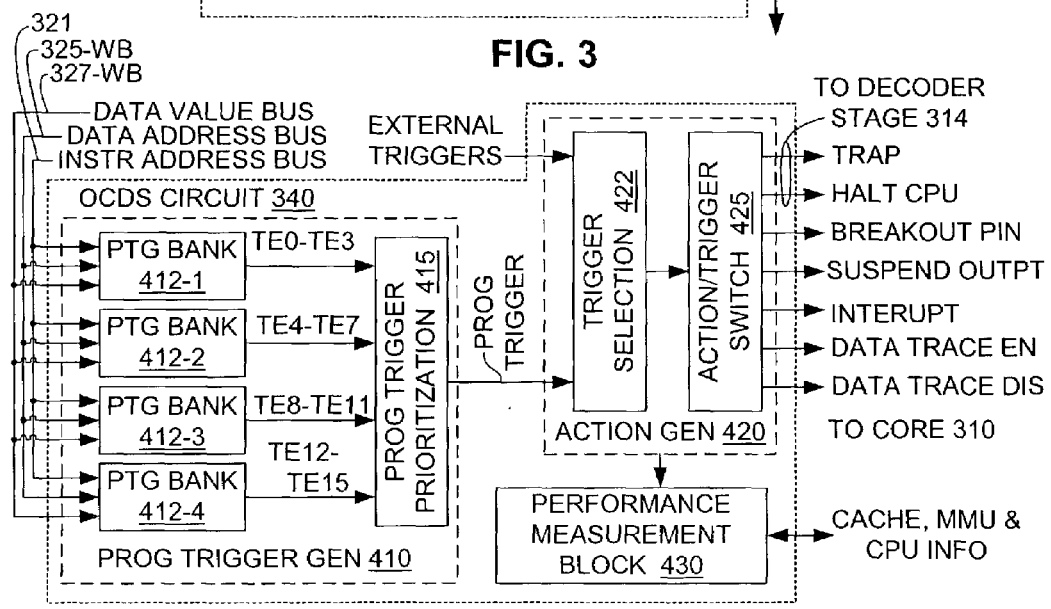
FIG. 4 is a block diagram showing an on-chip debug support circuit of the digital processor shown in FIG. 3.

FIG. 4 is a simplified block diagram showing OCDS circuit 340 in additional detail according to an embodiment of the present invention. OCDS circuit 340 includes a programmable trigger generator (PROG TRIGGER GEN) circuit 410, an action generator (ACTION GEN) circuit 420, and a performance measurement block 430. Programmable trigger generator 410 and action generator 420 are discussed in detail below. Performance measurement block 430 includes counters that can be used for multiple purposes, such as measuring the time taken by core 310 to complete a given task, caching performance analysis information associated with for a given application, measuring MMU performance, and verifying architectural features. Because the operation of performance measurement block 430 is peripheral to the operation of trigger generator 410 and action generator circuit 420, a detailed description of measurement block 430 is omitted for brevity.

Referring to the left side of FIG. 4, programmable trigger generator 410 includes one or more programmable trigger generator (PTG) banks 412-1 through 412-4, and an optional programmable trigger prioritization circuit 415. Programmable trigger generator (PTG) banks 412-1 through 412-4 generate several trigger signals TS0–TS15 in response to user-defined combinations or sequences of instruction addresses and/or data addresses/values processed transmitted on instruction address bus 321, data address bus 325-WB, and data value bus 327-WB, respectively (note that "instruction address bus 321" includes instruction addresses passed on both address bus 321-BBM from fetch stage 312 and address bus 321-BAM from write back stage 319; see FIG. 3). Because two or more of multiple trigger signals TS0–TS15 can be generated simultaneously, a programmable trigger prioritization circuit 415 is provided to select an output programmable trigger (PROG TRIGGER) signal from such simultaneously asserted multiple trigger signals TS0–TS15 according to predetermined hard-wired priority (although a user-programmable priority circuit may be used). As discussed in additional detail below, the output programmable trigger signal transmitted to action generator 420 includes an action identification that defines the action to be taken in response to the associated trigger signal TS0–TS15.

Figure 1:
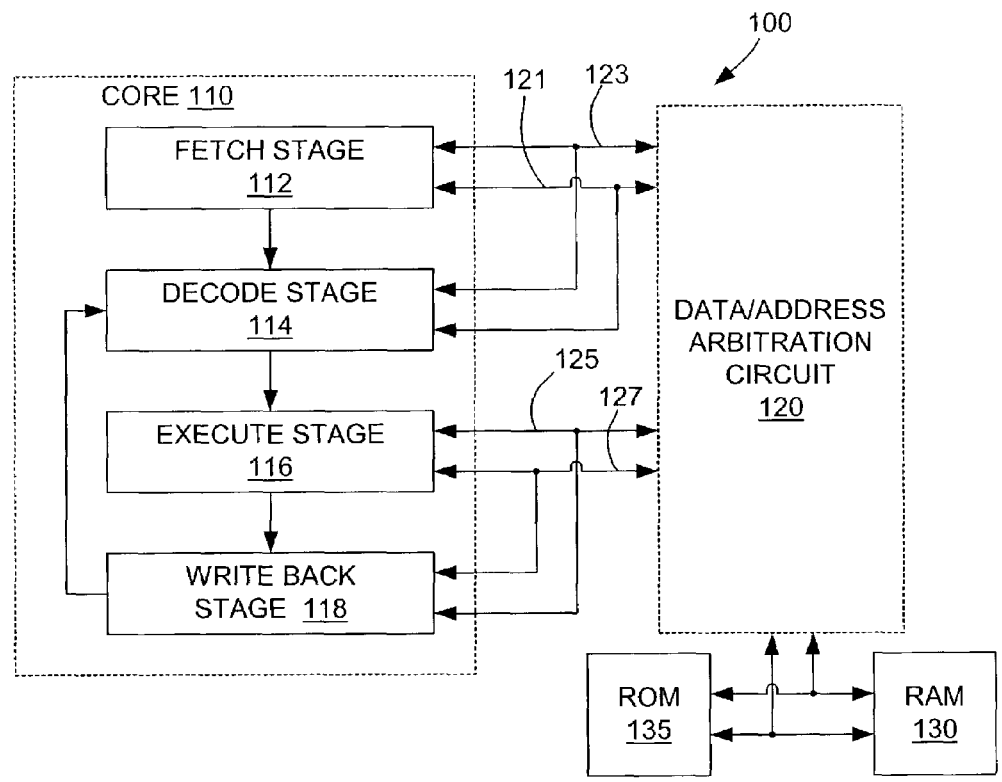
FIG. 1 is simplified block diagram showing a conventional digital processor.
Figure 2:
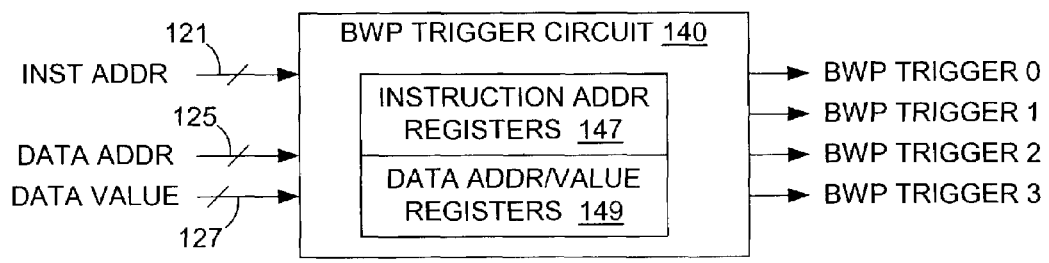
FIG. 2 is block diagram showing a conventional breakpoint/watchpoint circuit.

Action generator circuit 420 includes a trigger selection (e.g., multiplexing) circuit 422 and an action/trigger switch circuit 425. Trigger selection circuit 422 passes either one of the external triggers or the programmable trigger (received from trigger generator 410) to action/trigger switch 425 according to a predetermined priority. Each trigger passed to action/trigger switch 425 includes an action identification (ID)that corresponds to an associated BP trigger or WP trigger, and also includes source identification data and signals that specify whether the action is associated with a BBM or BAM action. Action/trigger switch 425 decodes the action ID associated with each trigger received from trigger selection circuit 422, and asserts the associated BWP trigger that is transmitted either to core 310 (i.e., in the case of a BP trigger) or to an external pin of processor 300 (in the case of a WP trigger). For example, when a programmable trigger generated by programmable trigger generator 410 is passed by trigger selection circuit 422 having an action ID corresponding to a "trap" or "halt" breakpoint trigger action, then action/trigger switch asserts a TRAP signal or a HALT CPU signal that is passed to decoder 314 of core 310 (see FIG. 1). Similarly, a programmable trigger having an action ID corresponding to a "breakout" or "suspend output" watchpoint trigger action, then action/trigger switch asserts a BREAKOUT PIN signal or a SUSPEND OUTPT signal that is passed to an appropriate register or other destination located outside of core 310. Similar trigger actions are taken with respect to external triggers, such as a debug instruction, an external break-in signal, or a Move value To a Core Register (MTCR) or Move value FROM a Core Register (MFCR) instruction.

Figure 5:
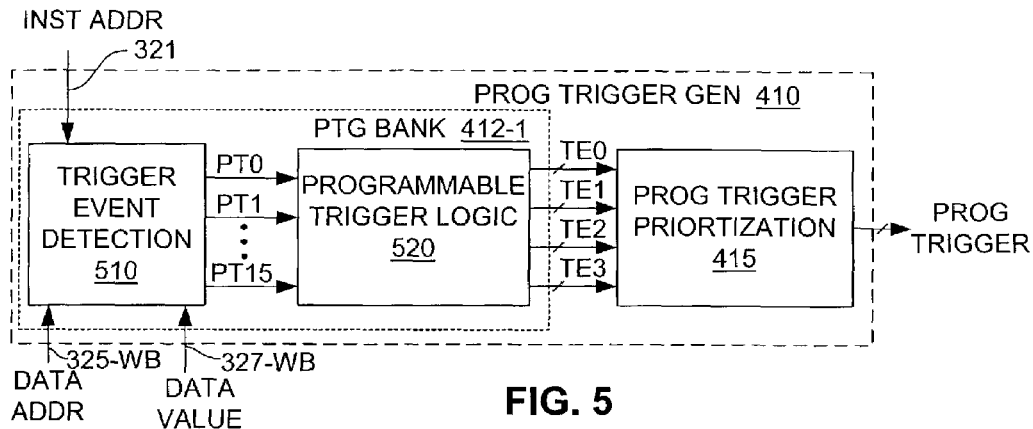
FIG. 5 is a block diagram showing programmable trigger generator according to an embodiment of the present invention.

FIG. 5 is a block diagram showing a portion of programmable trigger generator 410 in additional detail. In particular, FIG. 5 shows the main circuit blocks associated with PTG bank 412-1, which is representative of PTG banks 412-2 through 412-4 (see FIG. 4). In accordance with an embodiment of the present invention, PTG bank 412-1 includes a trigger event detection (TED) circuit 510 and a programmable trigger logic circuit 520. Similar to conventional BWP trigger circuits, TED circuit 510 monitors instruction addresses, data addresses, and data values transmitted on instruction address bus 321, data address bus 325-WB, and data value bus 327-WB, respectively, and generates pre-trigger signals PT0 through PT15 when user-defined addresses/values are transmitted on these busses. In particular, TED circuit 510 is programmed by a developer to store predetermined instruction addresses, data addresses, and data values. During debug operations, the stored addresses/values are compared with instruction addresses, data addresses, and data values transmitted on busses 321, 325-WB, and 327-WB, respectively. When the transmitted addresses/values match (or are within a range defined by) the stored addresses/values, an associated pre-trigger signal is generated that is passed to programmable trigger logic circuit 520. Programmable trigger logic circuit 520 is also programmed by the developer to selectively detect logical combinations of pre-trigger signals and/or sequences thereof, and to generate associated triggers TE0 through TE3 when the user-defined logical combinations and/or sequences occur. Triggers TE0 through TE3 are then passed to programmable trigger prioritization circuit 415 (discussed above), which passes one of these triggers (or a trigger from another PTG bank) to action generator 420 (see FIG. 4).

Figure 6:
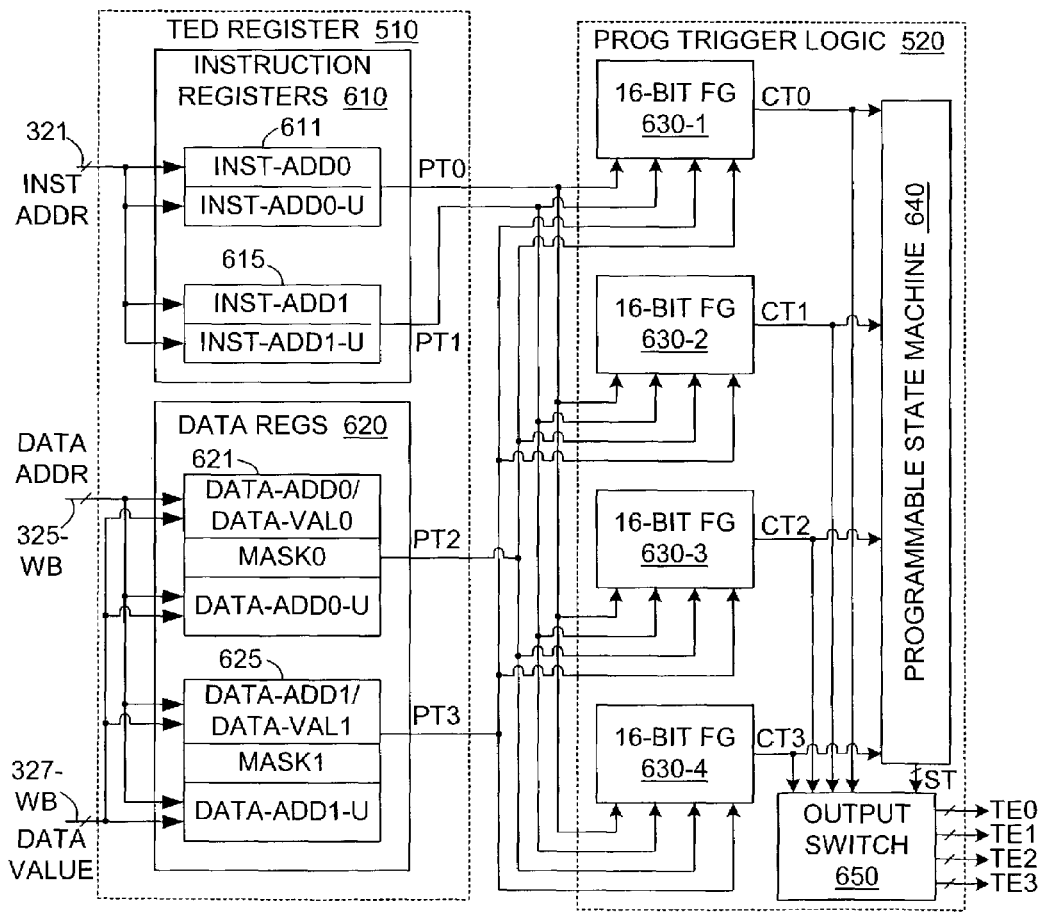
FIG. 6 is a simplified circuit diagram showing a portion of the programmable trigger generator of FIG. 5 according to an embodiment of the present invention.

FIG. 6 is a block diagram showing TED circuit 510 and programmable trigger logic circuit 520 of PTG bank 412-1 according to a specific embodiment of the present invention.

Referring to the left side of FIG. 6, TED circuit 510 includes instruction register circuit 610 that monitors instruction addresses transmitted on instruction address (INST ADDR) bus 321, and data register circuit 620 that monitors data addresses transmitted on data address (DATA ADDR) bus 325-WB and data values transmitted on data value bus 327-WB. Note that in dual pipeline processors, an additional instruction address bus associated with instructions passed from the fetch stage, as well as from the write back stage, to the decode stage on the second pipeline may also be monitored by instruction registers 610 using known techniques.

Instruction register circuit 610 includes a first register 611 for storing a first instruction address INST-ADD0 and an optional upper range instruction address INST-ADD0-U. In a single-address operating mode, first register 611 asserts a pre-trigger signal PT0 when an address transmitted on instruction address bus 321 matches instruction address INST-ADD0 (in this mode upper range address INST-ADD0-U is empty or disabled). Alternatively, in a multiple-address operating mode, first register 611 asserts pre-trigger signal PT0 when an address transmitted on instruction address bus 321 falls within a range defined by instruction addresses INST-ADD0 and INST-ADD0-U. Similarly, instruction register circuit 610 includes a second register 615 for storing a second instruction address INST-ADD1 and an optional upper range instruction address INST-ADD1-U, and generates a pre-trigger signal PT1 when an address transmitted on instruction address bus 321 matches instruction address INST-ADD1 (or falls within the range defined by INST-ADD1 and INST-ADD1-U).

Similar to instruction register circuit 610, data register circuit 620 includes a first register 621 for storing a first data address DATA-ADD0 and a first upper range address DATA-ADD0-U, and a second register 625 for storing a second data address DATA-ADD1 and a second upper range address DATA-ADD1-U. In addition, first register 621 also stores a first data value DATA-VAL0 and an optional first mask value MASK0, and second register 625 also stores a second data value DATA-VAL1 and an optional second mask value MASK1. Mask values MASK0 and MASK1 facilitate masking a portion or all of data values DATA-VAL0 and DATA-VAL1, thereby causing data register circuit 620 to operate in essentially the same manner as instruction register 610 (described above). In particular, first register 621 generates a pre-trigger signal PT2 when a data address transmitted on data address bus 325-WB matches data address DATA-ADD0 (or falls within the range defined by DATA-ADD0 and DATA-ADD0-U), and second register 625 generates a pre-trigger signal PT3 when a data address transmitted on data address bus 325-WB matches data address DATA-ADD1 (or falls within the range defined by DATA-ADD1 and DATA-ADD1-U). Some or all of the data values DATA-VAL0 and DATA-VAL1 can also be included in these comparison processes by associated use of mask values MASK0 and MASK1. For example, first register 621 can be programmed to match a particular data address transmitted on data address bus 325-WB and four bits of a data value transmitted on data value bus 327-WB by storing the desired data address as DATA-ADD0, storing the four bits in DATA-VAL0, and setting mask value MASK0 to mask all but these four bits.

Referring to the right side of FIG. 6, the four pre-trigger signals PT0 through PT3 generated by TED circuit 510 are transmitted to four 16-bit function generators (FGs) 630-1 through 630-3 of programmable trigger logic circuit 520. 16-bit FGs 630-1 through 630-4 are combinational logic circuits that generate intermediate (combinational) triggers CT0 through CT3 according to programmed functions of pre-triggers PT0 through PT3. In other words, combinational triggers CT0 through CT3 can be expressed as:

CT0=f0 (PT0, PT1, PT2, PT3);
CT1=f1 (PT0, PT1, PT2, PT3);
CT2=f2 (PT0, PT1, PT2, PT3); and
CT3=f3 (PT0, PT1, PT2, PT3), where f0, f1, f2, and f3 are any logical function of PT0, PT1, PT2 and PT3. Combinational triggers CT0 through CT3 that are either passed to a programmable state machine 640, or selectively converted by output switch circuit 650 to generate triggers TE0 through TE3. As discussed in additional detail below, programmable state machine 640 is programmed to generate a sequential trigger signal ST when a programmed sequence of combinational triggers is satisfied. When programmable state machine 640 is utilized, output switch circuit 650 generates an associated trigger (e.g., TE0) in response to sequential trigger signal ST (in this case, three unused triggers, e.g., TE1 through TE3, are disabled or otherwise unused).

Figure 7:
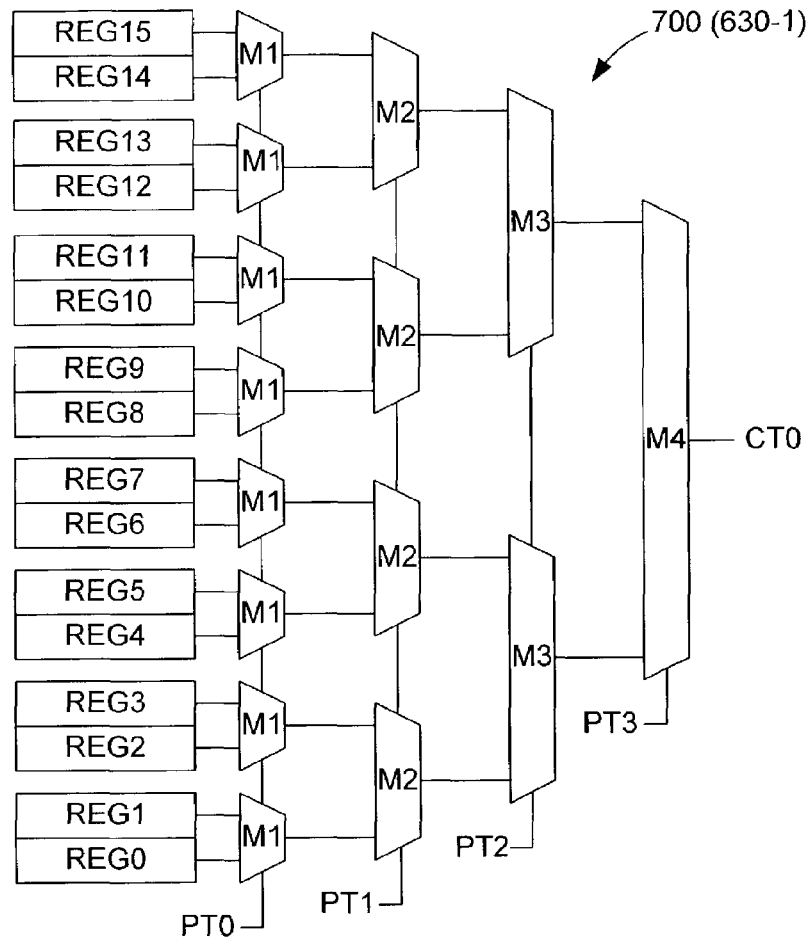
FIG. 7 is a simplified circuit diagram showing a sum-of-products circuit utilized in the programmable trigger generator of FIG. 5 according to an embodiment of the present invention.

FIG. 7 is a simplified diagram depicting a 16-bit sum-of-products circuit 700 that serves as 16-bit FG 630-1 according to a specific embodiment of the present invention. In particular, SOP circuit 700 includes sixteen registers REG0 through REG15 that store an associated bit (i.e., 0 or 1). Each register is coupled to input terminals of a first set of two-input MUXs, each designated M1, that are controlled by pre-trigger PT3. The output terminals of MUXs M1 are connected to input terminals of a second set of two-input MUXs, each designated M2, that are controlled by pre-trigger PT2. Similarly, the output terminals of MUXs M2 are connected to input terminals of two-input MUXs M3, which are controlled by pre-trigger PT1, and the output terminals of MUXs M3 are connected to input terminals of two-input MUX M4, which is controlled by pre-trigger PT0. By storing appropriate values in registers REG0 through REG 15, 16-bit SOP circuit 700 is capable of implementing any logical function of pre-trigger signals PT0 through PT3. For example, to define CT0=(PT0 or PT1) and (PT2 or PT3), then CT0 would be TRUE (i.e. binary value 1) in all the cases set forth in Table 1 (below):

TABLE 1

| PT3 | PT2 | PT1 | PT0 | REG. |
|---|---|---|---|---|
| 0 | 1 | 0 | 1 | 5 |
| 0 | 1 | 1 | 0 | 6 |
| 0 | 1 | 1 | 1 | 7 |
| 1 | 0 | 0 | 1 | 9 |
| 1 | 0 | 1 | 0 | 10 |
| 1 | 0 | 1 | 1 | 11 |
| 1 | 1 | 0 | 1 | 13 |
| 1 | 1 | 1 | 0 | 14 |
| 1 | 1 | 1 | 1 | 15 |

To assert combinational trigger signal CT0 under the conditions set forth in Table 1, a logic 1 is stored in each register REG5 through REG 7, REG 9 through REG11, and REG13 through REG15. One of these logic 1 values is, in effect, passed from its associated register through the series of MUXes shown in FIG. 7 when any of the combinations of pre-triggers shown in Table 1 is satisfied. Those of ordinary skill in the art will recognize that sum-of-products circuits other than the specific arrangement shown in FIG. 7 can be used to provide a similar programmable function, so SOP circuit 700 is therefore not intended to be limiting.

Referring briefly to FIG. 6, each of the combinational trigger signals CT0 through CT1 is applied to output switch 650, and also to programmable state machine 640.

Figure 8:
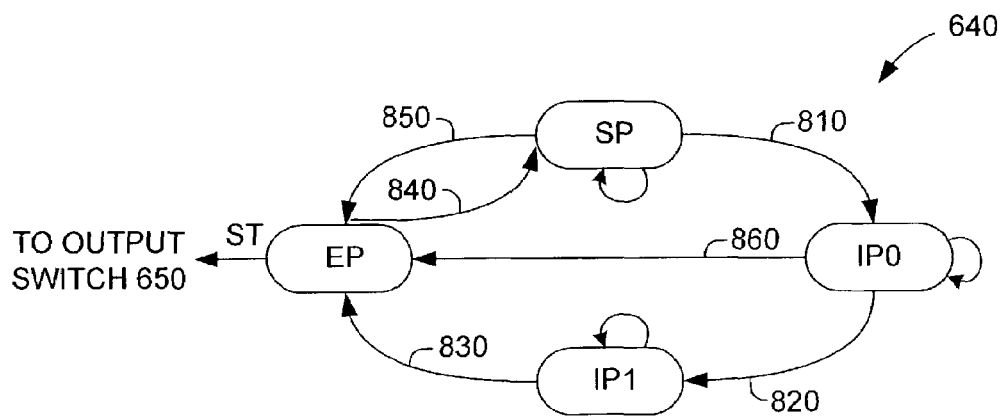
FIG. 8 is a finite state machine diagram depicting a state machine utilized in the programmable trigger generator of FIG. 5 according to an embodiment of the present invention.

FIG. 8 is a finite state machine diagram representation depicting programmable state machine 640 according to an embodiment of the present invention. State machine 640 includes four states: start point SP, first intermediate point IP0, second intermediate point IP1, and end point EP. Of course, state machine 640 can be implemented with any arbitrary number of states. Each state is assigned a two-bit code (i.e., having a value of zero to three) that identifies one of the four combinational trigger signals CT0 through CT3, and passes control to an associated next sequential state when the combinational trigger signal identified by the stored two-bit code is asserted. For example, assuming start point SP stores the two-bit code "00", control is retained by start point SP until combinational trigger signal CT0 is asserted, at which point control is passed on path 810 from start point SP to first intermediate point IP0. Subsequently, control is retained by first intermediate point IP0 until a combinational trigger signal matching the two-bit code associated with first intermediate point IP0 is asserted, at which point control is passed on path 820 from second intermediate point IP0 to second intermediate point IP1. Next, control is retained by second intermediate point IP1 until a combinational trigger signal matching the two-bit code associated with second intermediate point IP1 is asserted, at which point control is passed on path 830 from second intermediate point IP1 to end point EP. Finally, after control is passed to end point EP, control is retained until a combinational trigger signal matching the two-bit code associated with end point EP is asserted, at which point sequential trigger signal ST is asserted (i.e., passed to output switch 650; see FIG. 6), and control is returned on path 840 to start point EP.

If fewer than four states are desired, then end point EP is loaded with the same two-bit code as the last state of the dependency. For example, to generate sequential trigger signal ST in response to a single state sequence (e.g., when combinational trigger signal CT2 is asserted), then the two-bit codes for SP, IP0, IP1, and EP should be loaded with the digital values 2, 2, 2, and 2, respectively. This setting results in the direct passage of control from start point SP to end point EP along path 850 when combinational trigger signal CT2 is asserted. Similarly, to generate sequential trigger signal ST in response to the sequence of CT2 followed by CT1, the two-bit codes for SP, IP0, IP1, and EP should be loaded with the digital values 2, 1, 1, and 1, respectively. This setting results in the passage of control from start point SP to first intermediate point IP0 when combinational trigger signal CT2 is asserted, and then the passage of control from intermediate point IP0 directly to end point EP along path 860 when combinational trigger signal CT1 is subsequently asserted. Finally, to generate sequential trigger signal ST in response to the sequence of CT2 followed by CT1 and CT1 followed CT3 (i.e., CT2->CT1->CT3), the two-bit codes for SP, IP0, IP1, and EP should be loaded with the digital values 2, 1, 3, and 3, respectively.

Referring again to FIG. 6, output switch 650 is user-programmed to generate a predetermined set of trigger signals in response to corresponding combinational trigger signals CT0 through CT3 or in response to sequential trigger signal ST. For example, output switch 650 may be programmed to generate trigger TE0 in response to combinational trigger signal CT0, with trigger TE0 including an action ID associated with a "CPU halt" breakpoint trigger operation. Alternatively, output switch 650 may be programmed to generate trigger TE0 in response to sequential trigger signal ST, with trigger TE0 including an action ID associated with an "enable data trace" watchpoint trigger operation. The thus-generated triggers are then passed to action generator 420 (see FIG. 4) in the manner described above.

As set forth above, by providing a programmable BWP trigger circuit, a developer is able to selectively generate BWP trigger signals under a wide range of trigger events, both combinational and sequential, thereby facilitating greatly enhanced debugging operations during the development of a software program.

Although the present invention has been described with respect to certain specific embodiments, it will be clear to those skilled in the art that the inventive features of the present invention are applicable to other embodiments as well, all of which are intended to fall within the scope of the present invention. For example, any number of banks can be utilized to generate any number of trigger signals. Further, each bank can include any number of registers for generating pre-trigger signals based upon instruction addresses/values and data addresses/values. Function generators other than SOP circuits may be utilized. Moreover, the 16-bit SOP circuits described above for generating combinational trigger signals may be replaced, for example, with four-bit SOP circuits addressed by two pre-trigger signals, or 256-bit SOP circuits addressed by eight pre-trigger signals (it is noted, however, that the use of 256-bit SOP circuits may be impractical in some arrangements). Similarly, state machines other than those described herein may be utilized to identify sequences of trigger events. In yet other alternative embodiments, programmable trigger circuit 410 may omit programmable state machine 640, and only provide the combinational trigger signals from function generators 630-1 through 630-4. Alternatively, programmable trigger circuit 410 may omit function generators 630-1 through 630-4, and only provide a state machine driven by pre-trigger signals (which is functionally implemented in the disclosed embodiment by programming function generators 630-1 through 630-4 to "pass through" a corresponding pre-trigger signal).

The invention claimed is:

1. A digital processor comprising:
   a processor core including an instruction address bus, a data address bus, and a data value bus;
   a programmable breakpoint/watchpoint (BWP) trigger circuit including:
   a plurality of trigger event detection registers, each said register storing at least one trigger value and asserting a pre-trigger signal only when the stored trigger value matches a corresponding value transmitted on at least one of the data address bus, the data value bus, and the instruction address bus, and
   a programmable trigger logic circuit including a pluralty of function generators, each function generator including means for generating an intermediate trigger signal in response to a user-defined combination of the pre-trigger signals generated by the plurality of trigger event detection registers; and
   an action generator circuit for asserting a BWP trigger in response to the intermediate trigger signal.

2. The digital processor according to claim 1, wherein the plurality of trigger event detection registers include an instruction register for storing a first instruction address and a second instruction address, and wherein the instruction register includes means for asserting a first pre-trigger signal when a third instruction address transmitted on the instruction address bus is within a range defined by the first and second instruction addresses.

3. The digital processor according to claim 1, wherein the plurality of trigger event detection registers include a data register for storing a first data address, a second data address, and wherein the data register includes means for asserting a second pre-trigger signal when a third data address transmitted on the data address bus is within a range defined by the first and second data addresses.

4. The digital processor according to claim 3, wherein the data register further comprises a first data value and a mask value for masking a portion of the first data value, and wherein the data register includes means for asserting the second pre-trigger signal when a second data value transmitted on the data value bus matches an unmasked portion of the first data value.

5. The digital processor according to claim 1, wherein each of the function generators comprises a sum-of-products circuit for generating a combinational trigger signal that represents a user-defined function of the plurality of pre-trigger signals generated by the plurality of trigger event detection registers.

6. The digital processor according to claim 5, wherein the sum-of-products circuit comprises sixteen registers and a multiplexing structure that is controlled by four pre-trigger signals to pass a data value from one of the sixteen registers to an output terminal of the multiplexing structure.

7. The digital processor according to claim 1, wherein the programmable trigger logic circuit comprises first, second, third, and fourth function generators, each of the first, second, third, and fourth function generators including means for generating an associated intermediate trigger signal in response to a user-defined combination of the pre-trigger signals.

8. The digital processor according to claim 7, wherein the programmable trigger logic circuit further comprises a programmable state machine coupled to receive the associated intermediate trigger signals generated by the first, second, third, and fourth function generators, wherein the programmable state machine includes means for generating a sequential trigger signal when said associated intermediate trigger signals are asserted in a predefined sequence.

9. The digital processor according to claim 8, wherein the programmable state machine comprises a four-state finite state machine that includes means for passing control from a first state to a second state when a stored value associated with the first state matches an asserted one of said intermediate trigger signals.

10. The digital processor according to claim 8, wherein the programmable trigger logic circuit further comprises a programmable output switch for selectively passing one of the intermediate trigger signals generated by the first, second, third, and fourth function generators and the sequential trigger signal generated by the programmable state machine to the action generator.

11. A digital processor comprising:
a processor core including an instruction address bus, a data address bus, and a data value bus;
a programmable breakpoint/watchpoint (BWP) trigger circuit including:
a plurality of trigger event detection registers, each said register including a memory circuit for storing at least one trigger value, and means for asserting a pre-trigger signal only when the stored trigger value matches a corresponding value transmitted on at least one of the data address bus, the data value bus, and the instruction address bus, and
a programmable trigger logic circuit connected to receive the pre-trigger signals from the plurality of registers and including a programmable state machine for generating a sequential trigger signal in response to a predefined sequence of trigger events identified by the pre-trigger signals; and
an action generator circuit for asserting a BWP trigger in response to the sequential trigger signal.

12. The digital processor according to claim 11, wherein the plurality of trigger event detection registers include an instruction register for storing a first instruction address and a second instruction address, and wherein the instruction register includes means for asserting a first pre-trigger signal when a third instruction address transmitted on the instruction address bus is within a range defined by the first and second instruction addresses.

13. The digital processor according to claim 11, wherein the plurality of trigger event detection registers include a data register for storing a first data address, a second data address, and wherein the data register includes means for asserting a second pre-trigger signal when a third data address transmitted on the data address bus is within a range defined by the first and second data addresses.

14. The digital processor according to claim 13, wherein the data register further comprises a first data value and a mask value for masking a portion of the first data value, and wherein the data register includes means for asserting the second pre-trigger signal when a second data value transmitted on the data value bus matches an unmasked portion of the first data value.

15. The digital processor according to claim 11, wherein the function generator further comprises a plurality of sum-of-products circuits, each sum-of-products circuit including means for generating a combinational trigger signal that represents a user-defined combinational function of the plurality of pre-trigger signals generated by the plurality of trigger event detection registers.

16. The digital processor according to claim 15, wherein the programmable state machine includes means for generating a sequential trigger signal when said combinational trigger signals are asserted by said plurality of sum-of-products circuits in a predefined sequence.

17. The digital processor according to claim 11, wherein the programmable trigger logic circuit further comprises first, second, third, and fourth function generators, each of the first, second, third, and fourth function generators including means for generating an associated intermediate trigger signal in response to a user-defined combination of the pre-trigger signals.

18. The digital processor according to claim 17, wherein the programmable state machine is coupled to receive the associated intermediate trigger signals generated by the first, second, third, and fourth function generators, and wherein the programmable state machine includes means for generating a sequential trigger signal when said associated intermediate trigger signals are asserted in a predefined sequence.

19. The digital processor according to claim 18, wherein the programmable state machine comprises a four-state finite state machine that includes means for passing control from a first state to a second state when a stored value associated with the first state matches an asserted one of said intermediate trigger signals.

20. A digital processor comprising:
a processor core including an instruction address bus, a data address bus, and a data value bus;
a programmable breakpoint/watchpoint (BWP) trigger circuit including:
means for storing a plurality of trigger values, and for asserting a plurality of pre-trigger signals such that each pre-trigger signal is only asserted when an associated one of said stored trigger values matches a corresponding value transmitted on at least one of the data address bus, the data value bus, and the instruction address bus, and means for generating an intermediate trigger signal in response to (a) a user-defined combination of the plurality of pre-trigger signals, and (b) a user-defined sequence generated in response to the plurality of pre-trigger signals; and means for asserting a BWP trigger in response to the intermediate trigger signal.

* * * * *